MICROWAVE PHASE EQUALIZATION NETWORK

Filed March 11, 1968 3 Sheets-Sheet 1

INVENTOR.
GERALD F. ROSS
BY
S. C. Yeaton
ATTORNEY

MICROWAVE PHASE EQUALIZATION NETWORK

Filed March 11, 1968

INVENTOR.
GERALD F. ROSS
BY
S. C. Yeaton
ATTORNEY

INVENTOR.
GERALD F ROSS
BY
S. C. Yeaton
ATTORNEY

United States Patent Office 3,495,190
Patented Feb. 10, 1970

3,495,190

MICROWAVE PHASE EQUALIZATION NETWORK

Gerald F. Ross, Lexington, Mass., assignor to Sperry Rand Corporation, a corporation of Delaware Filed Mar. 11, 1968, Ser. No. 712,221
Int. Cl. H03h 5/12
U.S. Cl. 333—28 5 Claims

ABSTRACT OF THE DISCLOSURE

A microwave transmission network contains an input portion feeding a parallel branch portion which in turn supplies energy to a load. An impedance mismatch is purposely introduced between the input portion and the parallel branch portion and its effect on the transfer characteristic of the network is balanced by suitable delay and isolation means in the parallel branch portion.

BACKGROUND OF THE INVENTION

This invention relates to microwave circuits and more particularly to delay equalization means for use at microwave frequencies.

Microwave circuits are frequently required to transmit energy over a wide band of frequencies without distortion. Ordinarily, however, such circuits are dispersive in that they acuse a time delay that varies with the frequency of the signal being transmitted. This may cause serious difficulty in practical circuits. A short duration pulse, for instance, may be severely distorted in passing through such a circuit since the pulse is effectively composed of a number of individual signals at a variety of frequencies.

In lumped network theory, phase equalization networks such as constant resistance lattices are well-known.

The characteristics of such equalization networks can be determined by expressing the voltage transfer coefficient of the network in terms of the complex frequency variable and constructing a pole-zero plot from this expression. Such techniques are known and disclosed, for example, in U.S. Patent 2,342,638, issued to H. W. Bode on Feb. 29, 1944.

In general, such circuits are designed so that the pole and zero points constituting a given pair are located symmetrically with respect to the $j\omega$ axis. The amplitude spectrum or the magnitude of the voltage transfer coefficient for a given frequency is the ratio of two complex vector lengths for that frequency. Since the first of these vector lengths is the distance from the appropriate $\omega$ point to the pole point and the second of these vector lengths is the distance from the same $\omega$ point to the zero point, the amplitude spectrum equals unity. The phase vs. frequency behavior depends on the pole-zero location.

SUMMARY OF THE INVENTION

According to the principles of the present invention, a transmission network is provided in which an input circuit is purposely mismatched to a parallel branch circuit fed by the input circuit. The mismatch is chosen to provide poles in the transfer characteristic at convenient locations in the left hand of the "$p$" plane. Delay and isolation means are then provided in the parallel branch circuit and selected to provide zeroes of transmission in the right hand of the "$p$" plane at locations symmetrically disposed with respect to the corresponding poles.

DESCRIPTION OF THE PREFERRED EMBODIMENTS

It is known that connections of TEM mode transmission lines can be devised to provide a voltage transfer coefficient that is analytic in a region of the complex plane and displays a periodic pole-zero pattern.

By confining the operation to the region around one pole-zero pair, a satisfactory wide band approximation can result.

Figure 1:
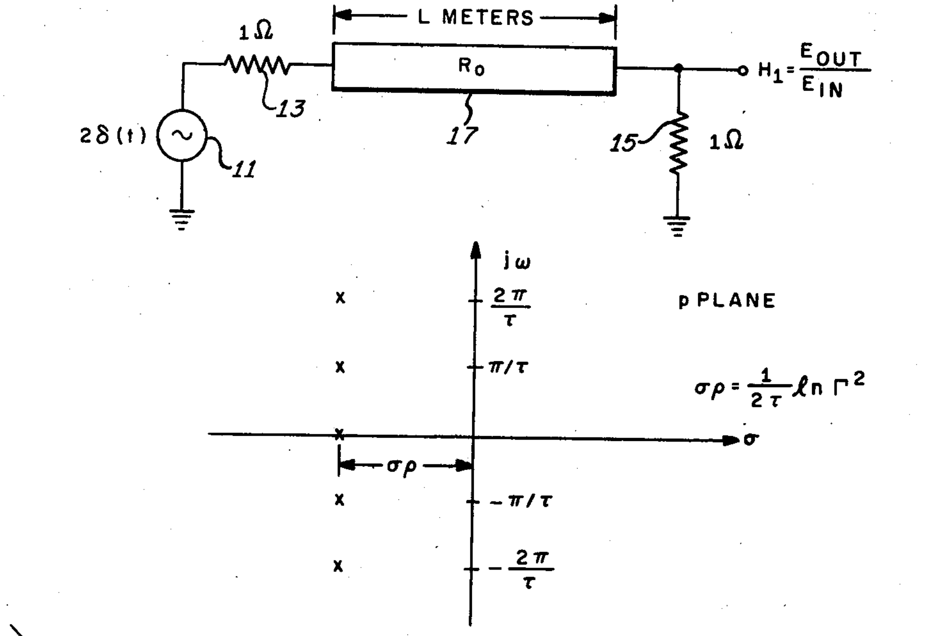
FIG. 1 is a diagram representing an input circuit for use in the invention together with a graph useful in explaining the operation of the circuit.

Consider, first, the network of FIG. 1. A two volt-second impulse generator 11 having an internal resistance of 1 ohm supplies pulses to a 1 ohm load 15 through a TEM mode transmission line 17 having a surge impedance $R_0$. The voltage transfer coefficient, $E_{out}/E_{in}$ of this network is given by:

$$H_1(Z)=\frac{(1-\Gamma^2)Z}{1-\Gamma^2Z^2} \qquad (1)$$

where:

$$\Gamma\equiv\frac{R_0-1}{R_0+1}$$

$$Z=e^{-p\tau}$$

$$\tau=\frac{\text{length of line 17}}{\text{velocity of light in medium}}=\frac{L}{c}$$

$p=\sigma+j\omega$, the complex frequency variable

The function $H_1(Z)$ has poles at the points:

$$p=\frac{1}{2\tau}\log_e \Gamma^2\pm j\frac{\pi n}{\tau}$$

where $n=0, 1, 2, \ldots$ as indicated in the pole-zero plot of FIG. 1.

Figure 2A:
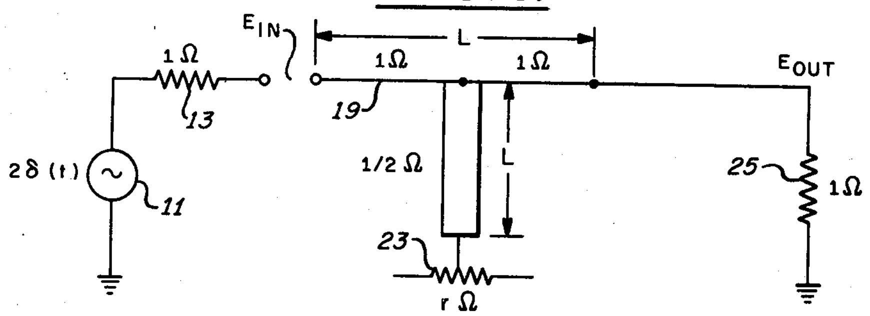
FIGS. 2($a$), 2($b$) and 2($c$) are diagrams representing a circuit and accompanying graphs useful in explaining the invention.
Figure 2B:
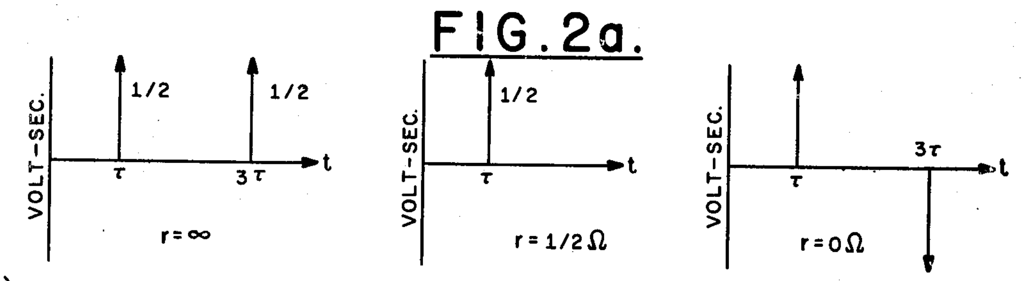
Figure 2C:
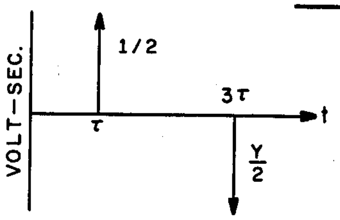

Consider, now, the characteristics of the network shown in FIG. 2. The 2-volt-second impulse generator 11 having an internal resistance 13 of 1 ohm is connected to a 1 ohm TEM mode transmission line 19. The line 19 has a length L. A ½ ohm stub 21 also of length L is connected to a midpoint of the line 19. The stub is terminated in a resistor 23 having a resistance of $r$ ohms. The line 19 is terminated in a 1 ohm load resistor 25.

The impulse response of the circuit of FIG. 2 is given by:

$$h_2(t)=\frac{1}{2}\delta\left(t-\frac{L}{c}\right)+\frac{\gamma\delta}{2}\left(t-\frac{3L}{c}\right) \qquad (2)$$
$$=\frac{1}{2}\{\delta(t-\tau)+\gamma\delta(t-3\tau)\}$$

where:

$$\gamma\equiv\frac{r-\frac{1}{2}}{r-\frac{1}{2}}$$

The voltage transfer coefficient for the circuit of FIG. 2(*a*) is given by:

$$H_2(Z)=\frac{1}{2}Z\{1+\gamma Z^2\} \qquad (3)$$

The impulse response is plotted in FIG. 2(*b*) for resistor 23 having a value of 0 ohms, ½ ohm, and infinity. If the resistor 23 is less than ½ ohm, the second impulse changes sign but its area can never exceed that of the first impulse. If resistor 23 is negative but larger than −½ ohm, ($0>r-\frac{1}{2}$) the area of the second impulse is given by:

$$\frac{\gamma}{2}=\frac{1}{2}\left[\frac{-r-\frac{1}{2}}{-r+\frac{1}{2}}\right]=\frac{1}{2}\left(\frac{2r+1}{2r-1}\right) \qquad (4)$$

This situation is pictured in FIG. 2(*c*). It can be seen that the area of the second impulse can exceed that of the first impulse.

Negative resistances of this type can be effectively provided by a conventional tunnel diode amplifier. The transfer function can be rewritten for this situation as:

$$H_2(Z)=\frac{1}{2}Z\left(1-\left[\frac{2r+1}{1-2r}\right]Z^2\right) \qquad (5)$$

Figure 3:
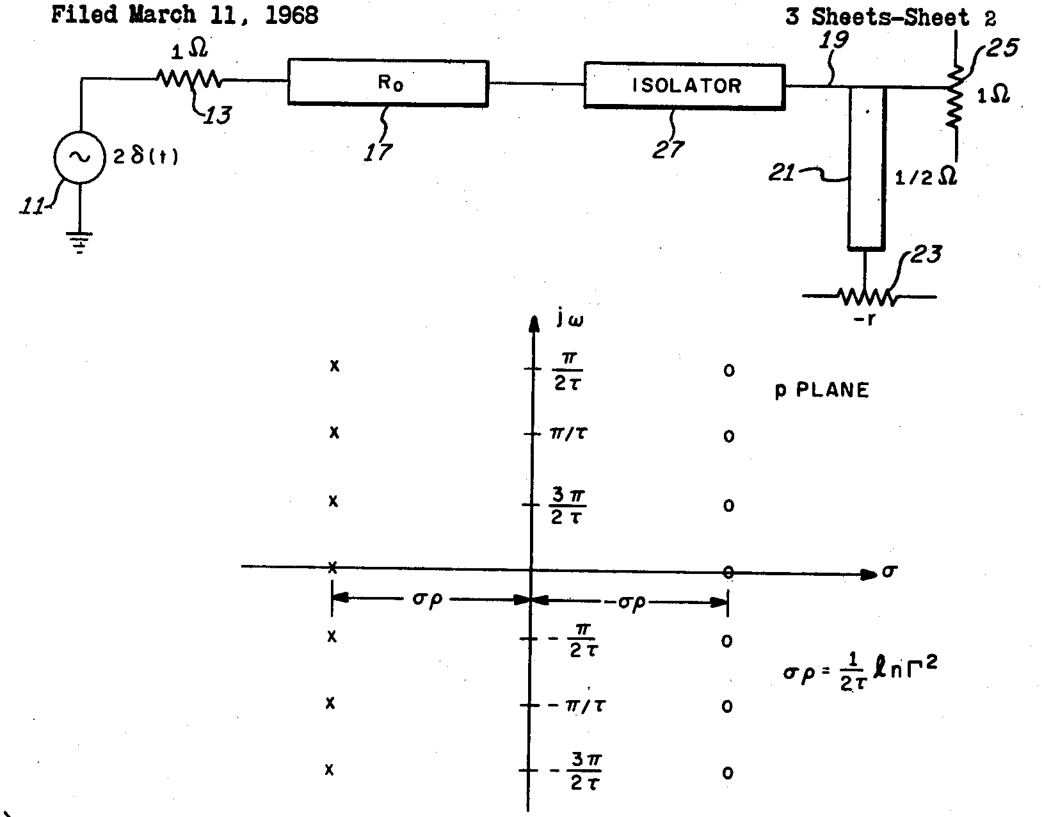
FIG. 3 is a diagram representing one form of the invention together with a graph explaining the operation of the invention.

The networks shown in FIG. 1 and in FIG. 2 may be connected in series and separated by an isolator as shown in FIG. 3.

The same two volt-second impulse generator 11 provides pulses that pass through the generator internal resistance 13 to the TEM mode transmission line 17. The pulses from the line 17 are then passed through an isolator 27, into the 1 ohm line 19, and on to the 1 ohm load resistor 25. The ½ ohm stub 21 is again terminated in a negative resistance 23. The overall voltage transfer coefficient is now $H(Z)=H_1(Z)\cdot H_2(Z)$ and thus can be written:

$$H(Z)=\left(\frac{1-\Gamma^2}{2}\right)Z^2\cdot\frac{1-\left(\frac{2r+1}{1-2r}\right)Z^2}{1-\Gamma^2Z^2} \qquad (6)$$

It will be noted that $0<\Gamma^2<1$ and $$\frac{2r+1}{1+2r}>1$$

since $0>r>-\frac{1}{2}$.

The term $$\left[\frac{1-\Gamma^2}{2}\right]$$

is a constant, and for convenience may be designated as "A." The term $Z^2$ represents an all-pass linear phase network or time delay. The formula for the over-all voltage transfer coefficient can be rewritten as:

$$H(Z)=AZ^2\cdot\frac{1-\epsilon^{\ln\left(\frac{2r+1}{1-2r}\right)-2p\tau}}{1-\epsilon^{\ln\Gamma^2}-2p\tau} \qquad (7)$$

If, now, $r$ is selected to satisfy the relationship:

$$\frac{1-2r}{1+2r}=\Gamma^2$$

it can be seen that a transmission zero exists at:

$$Re[\rho_{zero}]=\frac{1}{2\tau}\ln\frac{1}{\Gamma^2}=-\frac{1}{2\tau}\ln\Gamma^2 \qquad (8)$$

Since a transmission pole exists at:

$$Re[\rho_{pole}]=\frac{1}{2\tau}\ln\Gamma^2 \qquad (9)$$

$$|Re[\rho_{zero}]|=|Re[\rho_{pole}]|$$

it can be shown that this network acts the same as a constant resistance lattice in that it provides no amplitude distortion. In practice the network would operate with a broadband signal in the vicinity of the pole-zero pair:

$$p_{z_1}=-\frac{1}{2\tau}\log\Gamma^2\pm j\frac{\pi}{\tau} \qquad (10)$$

$$p_{p_1}=\frac{1}{2\tau}\log\Gamma^2\pm j\frac{\pi}{\tau} \qquad (11)$$

This network is capable of extremely broadband operation provided that the negative resistance (gain) can be maintained over the required band.

Figure 4A:
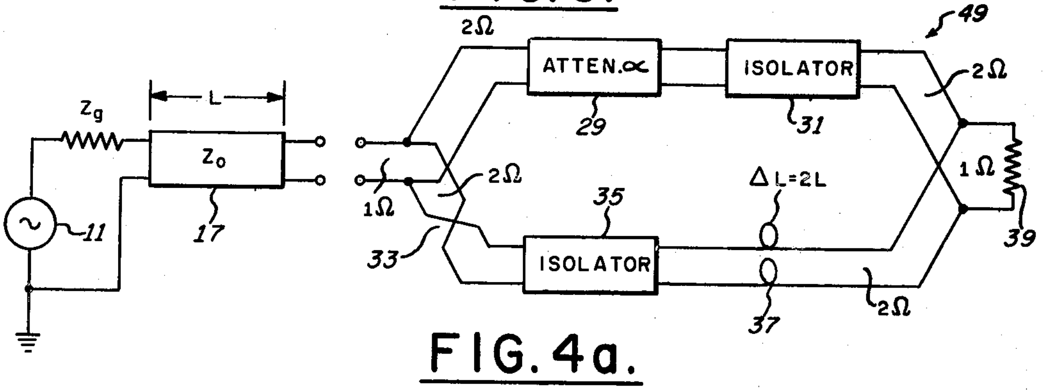
FIGS. 4($a$) and 4($b$) are diagrams representing another form of the invention.
Figure 4B:
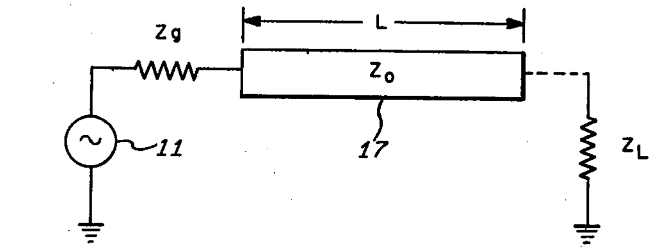

An embodiment of the invention that permits the use of a completely passive network is illustrated in FIG. 4(*a*).

An impulse generator 11, having an internal impedance designated generally as $Z_g$ is again connected to the TEM mode transmission line 17. The output of the line 17 is applied to parallel branches of a network 49. The upper branch of the network 49 contains an attenuator 29 providing an attenuation $\alpha$ and an isolator 31. These components are interconnected with a 2 ohm transmission line. The lower branch of the network 49 contains a crossed line section 33, an isolator 35, and a delay section 37. These components are also interconnected by means of a 2 ohm transmission line. The delay section provides a time delay equal to twice that provided by the line 17. The network 49 is terminated in a 1 ohm load 39. In general, the line 17 can be considered to look into a load $Z_L$ as indicated in FIG. 4(*b*). For convenience, that part of the circuit of FIG. 4 including the impulse generator, the line 17 and the effective load $Z_L$ may be considered as a modified input portion of the circuit. That part of the circuit including the branching elements, the attenuator, the isolators and the delay means may be considered as the parallel branch portion of the circuit.

The network of FIG. 4(*a*), requires two isolators and a crossed wire section. The voltage transfer coefficient for this configuration is proportional to:

$$H_2(Z)\sim\left(1-\frac{1}{\alpha}Z^2\right) \qquad (12)$$

and is of the same form as Formula 5. The negative sign is a result of the crossed wires in the section 33. If the cross wire section were eliminated, the voltage transfer coefficient would be proportional to:

$$H_2(Z)\sim\left(1+\frac{1}{\alpha}Z^2\right) \qquad (13)$$

This reversal in sign requires that a positive sign also exists between the terms in the denominator of $H_1(Z)$ defined in Formula 1.

The voltage transfer coefficient for the modified input portion of FIG. 4(*b*) is:

$$H_1(Z)=\frac{(1+\Gamma_1)(1+\Gamma_2)Z}{1+\Gamma_1\Gamma_2Z^2} \qquad (14)$$

$$\Gamma_1=\frac{Z_0-Z_g}{Z_0-Z_g},\ \Gamma_2=\frac{Z_L-Z_0}{Z_L+Z_0}$$

$\Gamma_1\Gamma_2$ will be positive if:

$$Z_g<Z_0<Z_L$$

or $$Z_g>Z_0>Z_L$$

Thus, if either restriction indicated by the last pair of formulas is satisfied, the need for crossed wires is eliminated. Furthermore, the isolators shown in FIG. 4(*a*) can be eliminated by introducing sufficient loss into the circuit.

Figure 5:
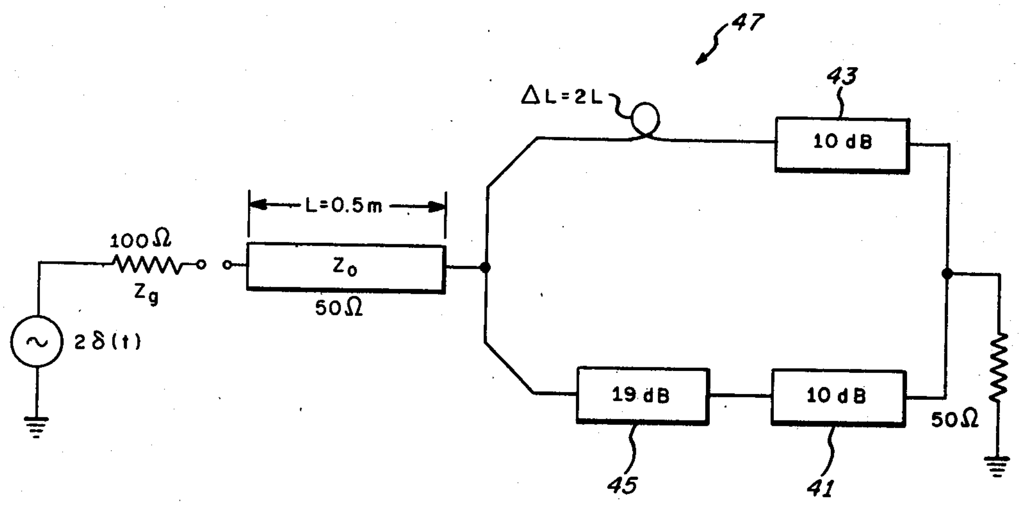
FIG. 5 is a diagram representing a presently preferred form of the invention.
Figure 5:
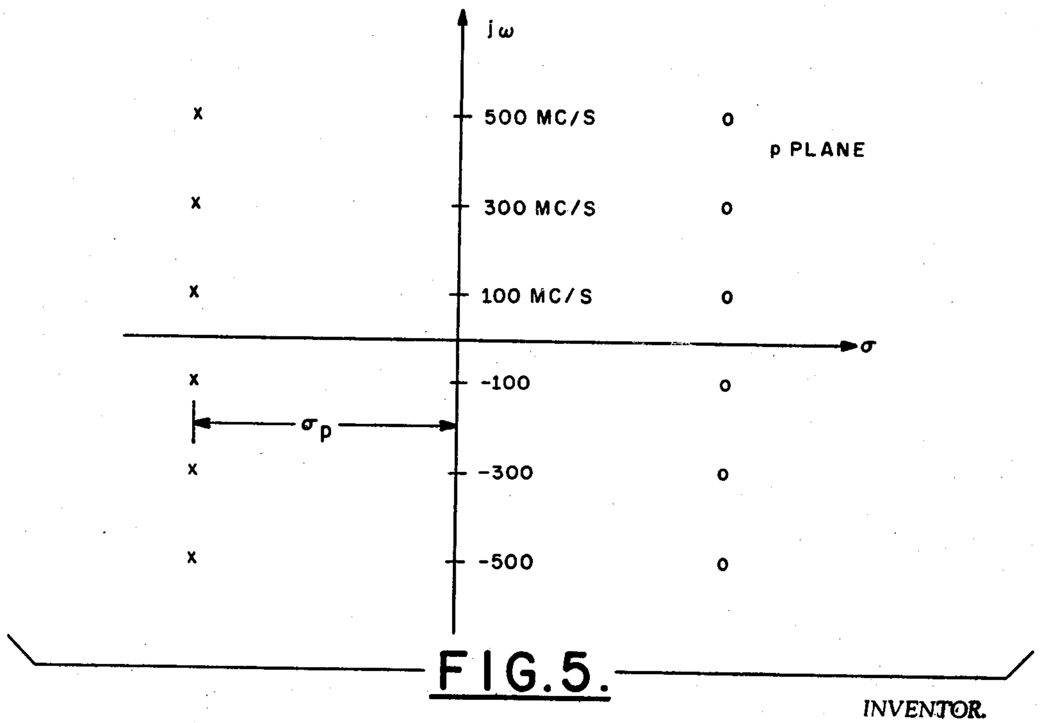

Such a variation of the over-all network of FIG. 4(*a*) is shown in FIG. 5 in which the isolators in each parallel branch have been replaced by the 10 db attenuators 41 and 43. In addition, a third attenuator 45 is placed in the lower branch of the network in order to provide differential attenuation between the two branches.

Functionally, the impedance mismatch between the modified input portion and the parallel branch portion of the circuits of FIG. 4 and FIG. 5 serves to locate the poles of the transfer characteristic in the left hand of the "*p*" plane. The combination of the proper delay and the proper attenuation locates the zeros of the transfer characteristic in the right hand of the "*p*" plane. The isolators in the circuit of FIG. 4 and the 10 db attenuators in the circuit of FIG. 5 serve to minimize undesired reflections at the branching element at the output end of the parallel branch portion of the circuit.

The voltage transfer coefficient of the parallel branch portion of the circuit of FIG. 5 is approximately:

$$H_2(Z)=\left[\frac{2}{3}\cdot\frac{\alpha}{3.15}\left(1+\frac{1}{\alpha}Z^2\right)Z^1\right] \qquad (15)$$

where $Z^1$ represents a time delay.

The over-all voltage transfer coefficient of the modified input portion and the parallel branch portion of the circuit of FIG. 5 is given by:

$$H(Z)=H_1(Z)\cdot H_2(Z)$$

where $H_1(Z)$ is given by Equation 14.

If, now $\Gamma_1$ is made equal to $\Gamma_2$, then $\Gamma_1=\Gamma_2=\Gamma$.

According to the principles of the invention, the attenuation, $\alpha$, provided by the attenuators in the parallel branch portion of the circuit is made equal to $\Gamma_1\Gamma_2$. The differential attenuation between branches is made equal to $1/\Gamma^2$. The differential delay is twice that of the transmission line 17 in the modified input portion.

The over-all voltage transfer coefficient may be written as $$[\beta Z^{1+1}]\left[\frac{1+\frac{1}{\Gamma_1\Gamma_2}Z^2}{1+\Gamma_1\Gamma_2 Z^2}\right]$$

where:

$$\beta=\frac{2(1+\Gamma_1)(1+\Gamma_2)\Gamma_1\Gamma_2}{3(3.15)}$$

The first pole in the left hand plane will occur at $$\tau=\frac{1}{2\tau_2}\ln\frac{1}{\Gamma^2}$$

$$\omega_1=\frac{\pi}{\tau_2};\quad f_1=\frac{1}{2\tau_2}$$

The pole-zero pattern repeats periodically as indicated in FIG. 5.

The continuous wave response of these networks is independent of frequency as revealed by the fact that the vector lengths from any point on the $j\omega$ axis to the pole and to the zero of a given pair are equal.

The specific values shown in the circuit of FIG. 5 apply to a wide band equalizer operating at a center frequency of 100 megacycles per second. It can be seen that $Z_0=50$ ohms, $Z_g=100$ ohms and $Z_L=25$ ohms.

Thus $\Gamma_1=\Gamma_2=\Gamma=-1/3$. The differential attenuation, therefore, is 1/9. This is supplied by the 19 db attenuator. For a TEM transmission line 17 using a polystyrene dielectric, $\tau_2=5\times10^{-9}$ seconds from which $f_1=100$ megacycles per second.

I claim:

1. A microwave wide band phase equalizer comprising a first TEM mode transmission line network adapted to receive energy from a microwave source of known internal impedance, a second TEM mode transmission line network connected in tandem with said first network; means to couple said second network to an external load; said first transmission line network including a series section of transmission line having a predetermined length, said series section having a characteristic impedance different from the internal impedance of the microwave source and different from the characteristic impedance of said second transmission line network so as to provide reflection coefficients at the input and the output of the section; the difference in characteristic impedances between said first and second transmission line networks being adjusted to provide a transmission pole at a desired location in the left hand part of the complex *p* plane; isolation means in said second network; said second transmission line network including first and second parallel branches; delay means in said first branch for providing a signal delay equal to twice the delay occurring in said series section; said delay and isolation means being adjusted to provide a transmission zero in the right hand part of the complex *p* plane at a location symmetrical with respect to said transmission pole; and an attenuator in said second branch for providing an attenuation numerically equal to the product of said input and output reflection coefficients.

2. The apparatus of claim 1 further including isolator means in each of said parallel branches for overcoming the effect of spurious reflections.

3. The apparatus of claim 1 in which the characteristic impedance of said series section is intermediate the internal impedance of said microwave source and the characteristic impedance of said second transmission line network.

4. The apparatus of claim 3 in which said input and output reflection coefficients are equal.

5. The apparatus of claim 3 in which said input and output reflection coefficients are equal.

References Cited

FOREIGN PATENTS 713,195 10/1941 Germany.
823,608 11/1959 Great Britain.

ELI LIEBERMAN, Primary Examiner

P. L. GENSLER, Assistant Examiner

U.S. Cl. X.R.

333—31